United States Patent
Kim et al.

(10) Patent No.: US 8,964,355 B2
(45) Date of Patent: Feb. 24, 2015

(54) MULTILAYER CERAMIC CAPACITOR AND MANUFACTURING METHOD THEREOF

(71) Applicant: Samsung Electro-Mechanics Co., Ltd., Suwon (KR)

(72) Inventors: Eung Soo Kim, Gyunggi-Do (KR); Jae Yeol Choi, Gyunggi-Do (KR); Doo Young Kim, Gyunggi-Do (KR); Jong Ho Lee, Gyunggi-Do (KR); Yu Na Kim, Gyunggi-Do (KR); Sung Woo Kim, Gyunggi-Do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 124 days.

(21) Appl. No.: 13/715,935

(22) Filed: Dec. 14, 2012

(65) Prior Publication Data

US 2014/0126110 A1    May 8, 2014

(30) Foreign Application Priority Data

Nov. 6, 2012  (KR) .................. 10-2012-0125065

(51) Int. Cl.
*H01G 4/228* (2006.01)
*H01G 4/12* (2006.01)

(52) U.S. Cl.
CPC ...................... *H01G 4/12* (2013.01)
USPC ............ 361/306.1; 361/301.4; 361/306.3; 361/308.1; 361/321.2; 29/25.41

(58) Field of Classification Search
None
See application file for complete search history.

(56) References Cited

U.S. PATENT DOCUMENTS

| | | | |
|---|---|---|---|
| 8,472,160 B2 * | 6/2013 | Takeuchi et al. | 361/301.1 |
| 2007/0251066 A1 | 11/2007 | Kim et al. | |
| 2012/0154978 A1 | 6/2012 | Kim | |
| 2013/0050899 A1 * | 2/2013 | Kim et al. | 361/321.2 |

FOREIGN PATENT DOCUMENTS

| | | |
|---|---|---|
| JP | 01-283809 A | 11/1989 |
| JP | 2003-007568 A | 1/2003 |
| JP | 2004-259736 A | 9/2004 |
| JP | 2004-259991 A | 9/2004 |
| JP | 2009-026872 A | 2/2009 |
| JP | 2009-054973 A | 3/2009 |
| JP | 2012-028502 A | 2/2012 |
| KR | 10-0587006 B1 | 5/2006 |
| KR | 10-1141434 B1 | 5/2012 |

OTHER PUBLICATIONS

Japanese Office Action with Full English Translation issued in Japanese Patent Application No. 2012-272814 mailed Sep. 24, 2013.
Korean Office Action with Full English Translation issued in Korean Patent Application No. 10-2012-0125065 mailed Dec. 23, 2013.

* cited by examiner

*Primary Examiner* — Dion R Ferguson
(74) *Attorney, Agent, or Firm* — McDermott Will & Emery LLP (57) ABSTRACT

There are provided a multilayer ceramic capacitor and a manufacturing method thereof, the multilayer ceramic capacitor including: a ceramic body; first and second internal electrodes; first and second external electrodes; and a first insulating layer.

21 Claims, 9 Drawing Sheets

MULTILAYER CERAMIC CAPACITOR AND MANUFACTURING METHOD THEREOF

CROSS-REFERENCE TO RELATED APPLICATIONS

This application claims the priority of Korean Patent Application No. 10-2012-0125065 filed on Nov. 6, 2012, in the Korean Intellectual Property Office, the disclosure of which is incorporated herein by reference.

BACKGROUND OF THE INVENTION

1. Field of the Invention

The present invention relates to a multilayer ceramic capacitor and a method of manufacturing the same.

2. Description of the Related Art

As examples of electronic components using a ceramic material there may be provided a capacitor, an inductor, a piezoelectric element, a varistor, a thermistor, and the like.

Among these ceramic electronic components, a multilayer ceramic capacitor (MLCC) has a small size and high capacity, and is easily mounted.

The multilayer ceramic capacitor, a condenser having a chip shape, may be installed in circuit boards of various electronic products including a display device such as a liquid crystal display (LCD), a plasma display panel (PDP), or the like, a computer, a personal digital assistant (PDA), a cellular phone, and the like, to be charged with or discharge electricity.

A multilayer ceramic capacitor may include a plurality of stacked dielectric layers, internal electrodes disposed to face each other, having the dielectric layer interposed therebetween, and external electrodes electrically connected to the internal electrodes.

Recently, as electronic products have been gradually miniaturized, miniaturization and ultrahigh capacitance of multilayer ceramic capacitors used in the electronic products has been required.

Therefore, a ceramic capacitor in which thicknesses of the dielectric layer and the internal electrode are reduced for miniaturization of the product and the number of stacked dielectric layers is increased for ultra high capacitance has been manufactured, but there is a limitation in increasing the capacitance of the product with only this configuration.

Meanwhile, a multilayer ceramic capacitor in which internal electrodes are exposed to the same surface (a lower surface) such that the lower surface of the capacitor may be a mounting surface has been disclosed.

However, in the multilayer ceramic capacitor according to the related art, the internal electrodes are disposed perpendicularly to the mounting surface, such that it may be difficult to use the capacitor in the case in which the capacitor needs to be mounted in such a manner that internal electrodes are horizontally disposed with respect to the mounting surface.

The following Related Art Documents 1 and 2 had disclosed a structure in which lead portions of first and second internal electrodes are exposed through end portions of dielectric layers and first and second external electrodes are formed on both ends of a ceramic body so as to be electrically connected to the lead portions of the first and second internal electrodes.

RELATED ART DOCUMENT (Patent Document 1) Korean Patent Publication No. 10-0587006

(Patent Document 2) Korean Patent Publication No. 10-1141434

SUMMARY OF THE INVENTION

An aspect of the present invention provides a multilayer ceramic capacitor having excellent capacitance and allowing an internal electrode to be horizontally disposed with respect to a mounting surface thereof to be mounted, a manufacturing method thereof.

According to an aspect of the present invention, there is provided a multilayer ceramic capacitor including: a ceramic body; first and second internal electrodes including first and second lead portions having regions overlapped with each other and exposed to one surface of the ceramic body, respectively; first and second external electrodes including first and second lead connection portions formed on the one surface of the ceramic body and connected to the first and second lead portions, respectively, and first and second external terminal portions formed to extended from one ends of the first and second lead connection portions to a surface perpendicular to the one surface of the ceramic body to which the first and second lead portions are exposed to thereby be exposed to the outside, respectively; and a first insulating layer formed on the one surface of the ceramic body so as to cover the first and second lead portions and the first and second lead connection portions that are exposed to the one surface of the ceramic body.

The first and second internal electrodes may be horizontally disposed with respect to the surface of the ceramic body on which the first and second external terminal portions are formed.

The first lead connection portion may be connected to a region of the first lead portion that is not overlapped with the second lead portion, and the second lead connection portion may be connected to a region of the second lead portion that is not overlapped with the first lead portion.

The first insulating layer may be formed to cover all of the first and second lead portions and the first and second lead connection portions.

The first and second external electrodes may further include third and fourth external terminal portions extended from the other ends of the first and second lead connection portions to a surface opposing the surface of the ceramic body on which the first and second external terminal portions are formed to thereby be exposed to the outside, respectively.

In the first internal electrode, the first lead portion may include a plurality of first lead portions exposed to the one surface of the ceramic body and respectively have regions overlapped with the second lead portion, and the first external electrode may include a plurality of first external electrodes connected to the plurality of first lead portions.

The first and second internal electrodes may include third and fourth lead portions exposed to the other surface opposing the one surface of the ceramic body, respectively, and the third and fourth lead portions may have regions overlapped with each other.

The first and second external electrodes may further include third and fourth lead connection portions formed on the other surface opposing the one surface of the ceramic body, connected to the third and fourth lead portions, and connected to one ends of the first and second external terminal portions, respectively.

The third lead connection portion may be connected to a region of the third lead portion that is not overlapped with the fourth lead portion and the fourth lead connection portion may be connected to a region of the fourth lead portion that is not overlapped with the third lead portion.

The multilayer ceramic capacitor may further include a second insulating layer formed on the other surface opposing the one surface of the ceramic body and covering the third and fourth lead portions and the third and fourth lead connection portions that are exposed to the other surface of the ceramic body.

The second insulating layer may be formed to cover all of the third and fourth lead portions and the third and fourth lead connection portions.

According to another aspect of the present invention, there is provided manufacturing method of a multilayer ceramic capacitor, the manufacturing method including: forming a first internal electrode on a first ceramic sheet such that a first lead portion is exposed through one end surface of the first ceramic sheet; forming a second internal electrode on a second ceramic sheet such that a second lead portion is exposed through one end surface of the second ceramic sheet while having regions overlapped with the first lead portion; forming a ceramic body by alternately stacking and firing a plurality of the first and second ceramic sheets on which the first and second internal electrodes are formed; forming first and second lead connection portions on one surface of the ceramic body so as to be connected to the first and second lead portions, respectively; forming first and second external terminal portions extended from one ends of the first and second lead connection portions and exposed to the outside on a surface perpendicular to the one surface of the ceramic body to which the first and second lead portions are exposed; and forming a first insulating layer on the one surface of the ceramic body so as to cover the first and second lead portions and the first and second lead connection portions.

In the forming of the first and second lead connection portions, the first lead connection portion may be formed in a direction in which the first and second ceramic sheets are stacked in a region of the first lead portion that is not overlapped with the second lead portion on the one surface of the ceramic body, while the second lead connection portion may be formed in the direction in which the first and second ceramic sheets are stacked in a region of the second lead portion that is not overlapped with the first lead portion on the one surface of the ceramic body.

The forming of the first insulating layer may be performed by applying a ceramic slurry to the one surface of the ceramic body so as to cover all of the first and second lead portions and the first and second lead connection portions.

The manufacturing method of a multilayer ceramic capacitor may further include forming third and fourth external terminal portions extended from the other end of the first and second lead connection portions to be exposed to the outside on a surface opposing the surface on which the first and second external terminal portions are formed, after the forming of the first and second external terminal portions.

In the forming of the first internal electrode, the first lead portion may be provided in plural and the plurality of first lead portions may be formed to be exposed through the one end surface of the first ceramic sheet and respectively have regions overlapped with the second lead portion, and in the forming of the first lead connection portion and the first external terminal portion, the first lead connection portion and the first external terminal portion may be respectively provided in plural and the plurality of first lead connection portions and first external terminal portions may be connected to the plurality of first lead portions.

In the forming of the first and second internal electrodes, third and fourth lead portions exposed to the other end surface opposing the one end surface of the first and second ceramic sheets are further formed, respectively, and the third and fourth lead portions may have regions overlapped with each other.

The manufacturing method of a multilayer ceramic capacitor may further include forming third and fourth lead connection portions connected to the third and fourth lead portions and one ends of the first and second external terminal portions, respectively, on the other surface opposing the one surface of the ceramic body, after the forming of the first and second lead portions.

In the forming of the third and fourth lead connection portions, the third lead connection portion may be formed in a direction in which the first and second ceramic sheets are stacked in a region of the third lead portion that is not overlapped with the fourth lead portion on the other surface of the ceramic body, while the fourth lead connection portion is formed in the direction in which the first and second ceramic sheets are stacked in a region of the fourth lead portion that is not overlapped with the third lead portion on the other surface of the ceramic body.

The manufacturing method of a multilayer ceramic capacitor may further include forming a second insulating layer on the other surface opposing the one surface of the ceramic body by applying a ceramic slurry so as to cover all of the third and fourth lead portions and the third and fourth lead connection portions, after the forming of the first insulating layer.

The first and second insulating layers may be formed by a BMP method.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

Figure 1:
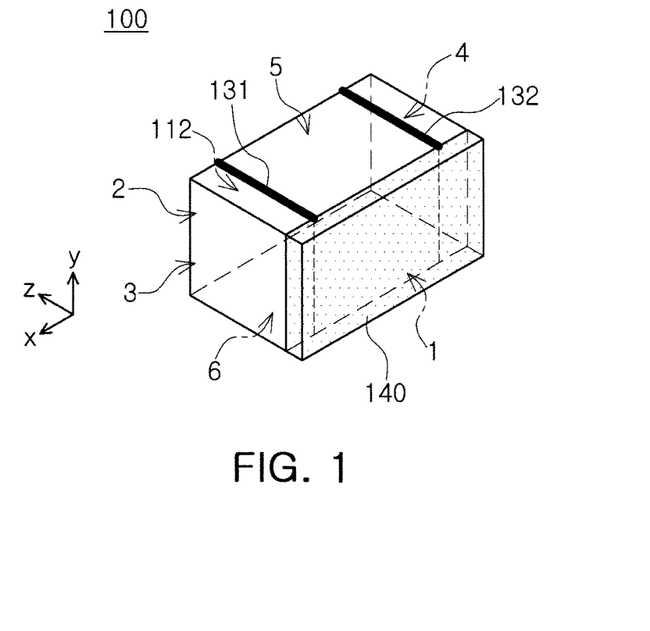
FIG. 1 is a transparent perspective view schematically showing a multilayer ceramic capacitor according to an embodiment of the present invention.
Figure 2:
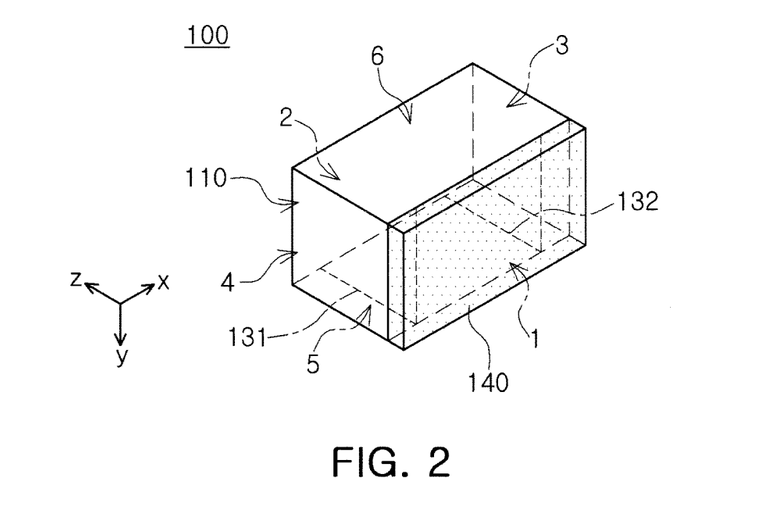
FIG. 2 is a transparent perspective view showing the multilayer ceramic capacitor of FIG. 1 in a direction in which the capacitor is mounted.
Figure 3:
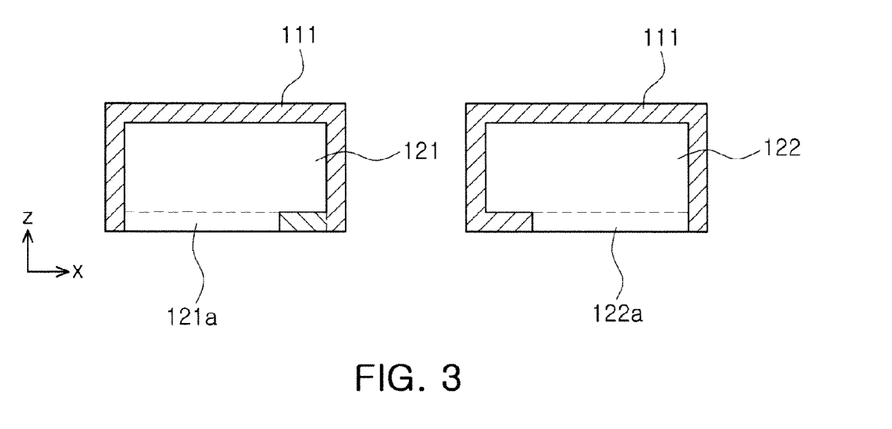
FIG. 3 is a transverse cross-sectional view showing structures of first and second internal electrodes of the multilayer ceramic capacitor of FIG. 1.
Figure 4:
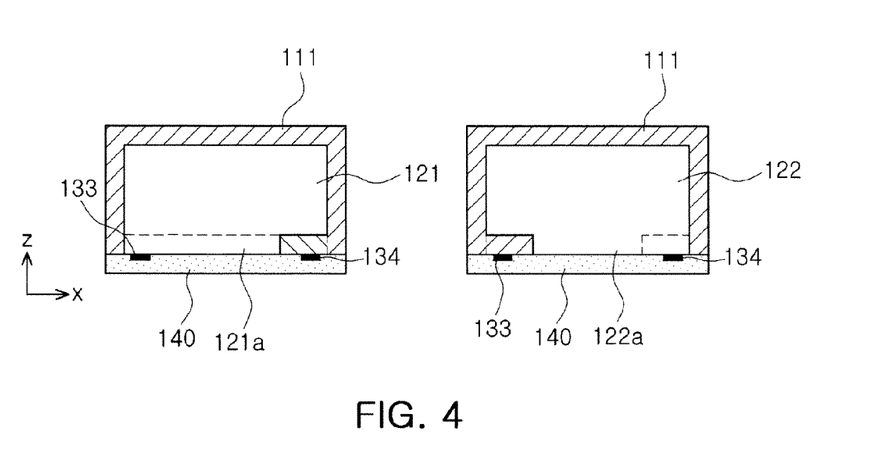
FIG. 4 is a transverse cross-sectional view showing a structure in which a first insulating layer is additionally formed in the first and second internal electrodes of FIG. 3.
Figure 5A:
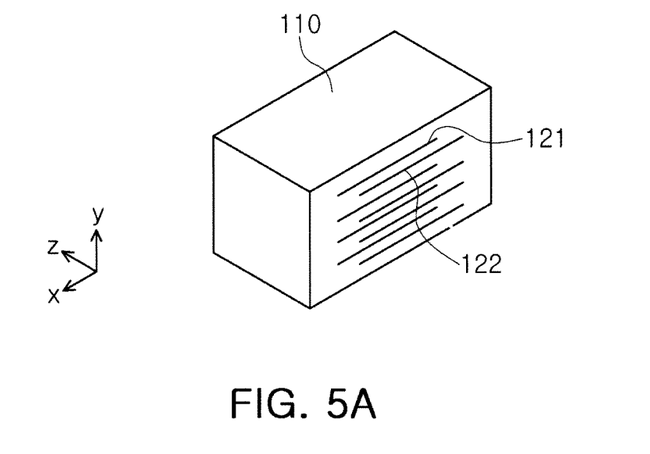
FIGS. 5A through 5C are perspective views sequentially showing a process of forming the multilayer ceramic capacitor of FIG. 1.
Figure 5B:
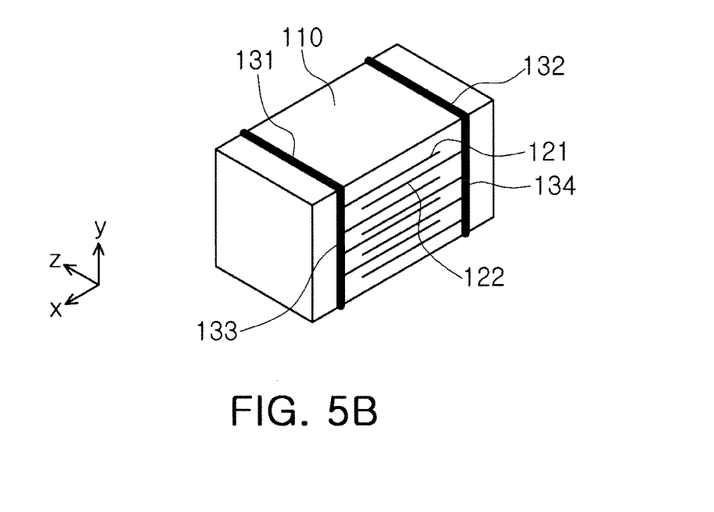
Figure 5C:
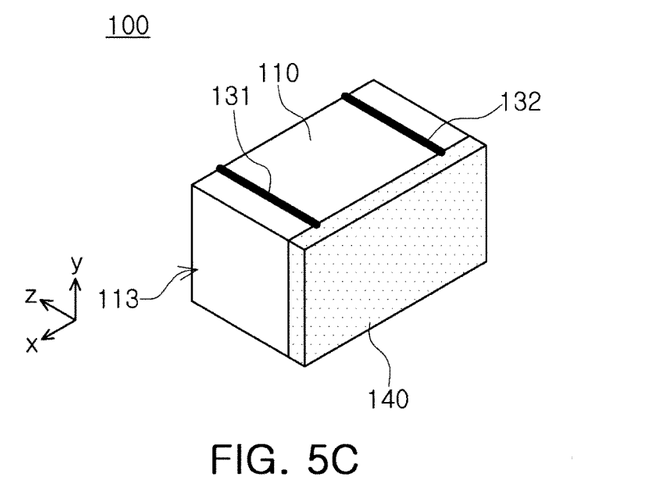

FIG. 1 is a transparent perspective view schematically showing a multilayer ceramic capacitor according to an embodiment of the present invention; FIG. 2 is a transparent perspective view showing the multilayer ceramic capacitor of FIG. 1 in a direction in which the capacitor is mounted; FIG. 3 is a transverse cross-sectional view showing structures of first and second internal electrodes of the multilayer ceramic capacitor of FIG. 1; FIG. 4 is a transverse cross-sectional view showing a structure in which a first insulating layer is additionally formed in the first and second internal electrodes of FIG. 3; and FIGS. 5A through 5C are perspective views sequentially showing a process of forming the multilayer ceramic capacitor of FIG. 1.

According to the embodiment of the present invention, an x-direction refers to a direction in which first and second external electrodes are formed, having a predetermined interval therebetween, a y-direction refers to a direction in which first and second internal electrodes 121 and 122 are stacked, having each dielectric layer 111 interposed therebetween, and a z-direction refers to a width direction of a ceramic body 110 in which the first and second internal electrodes 121 and 122 are mounted.

The multilayer ceramic capacitor according to the present embodiment may be a horizontally laminated or horizontally multilayered two-terminal capacitor.

The term "horizontally laminated or horizontally multilayered" means that internal electrodes laminated within a capacitor are horizontally disposed with respect to a mounting surface of a circuit board, and the term "two-terminal" means that two terminals are connected to the circuit board as terminals of the capacitor.

Referring to FIGS. 1 through 5C, a multilayer ceramic capacitor 100 according to the embodiment of the present invention may include a ceramic body 110, first and second internal electrodes 121 and 122 formed in the ceramic body 110, an insulating layer 140 formed on one surface of the ceramic body 110, and first and second external electrodes.

According to the present embodiment, the ceramic body 110 may have first and second surfaces 1 and 2 opposing each other, and third to sixth surfaces 3 to 6 connecting the first and second surfaces 1 and 2 to each other.

A shape of the ceramic body 110 is not particularly limited but may be a rectangular parallelepiped shape having the first to six surfaces, as shown. In addition, according to the embodiment of the present invention, the fifth surface 5 of the ceramic body 110 may be a mounting surface disposed on a mounting area of a circuit board.

Further, a size of the ceramic body 110 is not particularly limited. For example, the ceramic body 110 may have a size of 0.6 mm×0.3 mm, thereby configuring a multilayer ceramic capacitor having high capacitance of 1.0 μF or more.

The ceramic body 110 as described above may be formed by stacking a plurality of dielectric layers 111 and then firing the stacked dielectric layers 111.

Here, the plurality of dielectric layers 111 configuring the ceramic body 110 are in a fired state and may be integrated such that boundaries between dielectric layers 111 adjacent to each other may not be readily apparent.

The dielectric layers 111 may be formed by firing ceramic green sheets including a ceramic powder, an organic solvent, and an organic binder. As the ceramic powder, a material having a high dielectric constant, a barium titanate ($BaTiO_3$) based material, a strontium titanate ($SrTiO_3$) based material, or the like, may be used. However, the ceramic powder is not limited thereto.

After the first and second internal electrodes 121 and 122 are formed and alternately stacked on the ceramic green sheets forming the dielectric layers 111, the first and second internal electrodes 121 and 122 may be disposed in the ceramic body 110 in the y-direction so as to face each other, having each dielectric layer 111 interposed therebetween.

The first and second internal electrodes 121 and 122 as described above may be formed by printing a conductive paste including a conductive metal on at least one surface of the dielectric layer 111.

The conductive metal may be nickel (Ni), copper (Cu), palladium (Pd), or an alloy thereof but is not limited thereto.

In addition, as a method of printing the conductive paste, a screen printing method, a gravure printing method, or the like, may be used, but the present invention is not limited thereto.

Further, the first and second internal electrodes 121 and 122 may be a pair of electrodes having opposing polarities, may be disposed to face each other in a direction in which the dielectric layers 111 are stacked, and may be electrically insulated from each other by the dielectric layer 111 disposed therebetween.

According to the embodiment of the present invention, the first and second internal electrodes 121 and 122 may be horizontally disposed with respect to the mounting surface, that is, the fifth surface 5, of the multilayer ceramic capacitor.

In the present embodiment, the first and second internal electrodes 121 and 122 have first and second lead portions 121a and 122a so as to be connected to the first and second external electrodes having opposing polarities, respectively, and the first and second lead portions 121a and 122a may be exposed to the first surface 1 of the ceramic body 110.

According to the embodiment of the present invention, the first and second lead portions may refer regions having an increased width W in a conductive pattern forming the first and second internal electrodes 121 and 122 to thereby be exposed to the first surface 1 of the ceramic body 110.

Generally, the first and second internal electrodes 121 and 122 may form capacitance through regions thereof being overlapped with each other, and the first and second lead portions 121a and 122a connected to the first and second external electrodes having opposing polarities do not have regions thereof overlapped with each other.

However, according to the embodiment of the present invention, the first and second lead portions 121a and 122a may have a region overlapped with each other. That is, the first and second lead portions 121a and 122a may be exposed to the first surface 1, and a portion of the exposed regions of the first and second lead portions 121a and 122a may be overlapped with each other, thereby increasing the capacitance of the capacitor.

In a left-side view of FIG. 3, a portion of the first internal electrode 121 overlapped with the second internal electrode 122 is denoted by a dotted line, and in a right-side view of FIG. 3, a portion of the second internal electrode 122 overlapped with the first internal electrode 121 is denoted by a dotted line.

The first and second external electrodes may include first and second lead connection portions 133 and 134 connected to the first and second lead portions, respectively, and first and second external terminal portions 131 and 132 bent from one ends of the first and second lead connection portions 133 and 134 to be extended to the fifth surface 5 of the ceramic body 110.

The first lead connection portions 133 may be vertically connected to a region of the first lead portion 121a that is not overlapped with the second lead portion 122a, and the second lead connection portion 134 may be vertically connected to a region of the second lead portion 122a that is not overlapped with the first lead portion 121a.

The first and second external terminal portions 131 and 132 may be exposed to the outside on the fifth surface 5 of the ceramic body 110, such that the fifth surface 5 of the ceramic body 110 may be the mounting surface thereof.

Therefore, even though the multilayer ceramic capacitor has a lower surface electrode pattern structure, the mounting surface thereof is disposed in a similar manner as the case of the existing product, such that the multilayer ceramic capacitor may be used as the horizontally laminated or horizontally multilayered ceramic capacitor.

Meanwhile, the first and second external electrodes may further include third and fourth external terminal portions (not shown) bent from the other ends of the first and second lead connection portions 133 and 134 to be extended to the sixth surface 6 of the ceramic body 110.

Here, the third and fourth external terminal portions may be exposed to the outside on the fifth surface 6 of the ceramic body 110, such that the sixth surface 6 of the ceramic body 110 may be the mounting surface.

The first insulating layer 140 may be formed on the first surface 1 of the ceramic body 110 to cover the first and second lead portions 121a and 122a and the first and second lead connection portions 133 and 134 that are exposed to the first surface 1 of the ceramic body 110. The first insulating layer 140 may be formed to cover all of regions of the first and second lead portions 121a and 122a in which the first and second lead portions 121a and 122a are overlapped.

The first insulating layer 140 may cover the first and second lead portions 121a and 122a of the first and second internal electrodes 121 and 122 and the first and second lead connection portions 133 and 134 that are exposed to the first surface 1 of the ceramic body 110 to prevent short circuits between the internal electrodes and the external electrodes and internal defects such as deterioration in moisture resistance, or the like.

Figure 6:
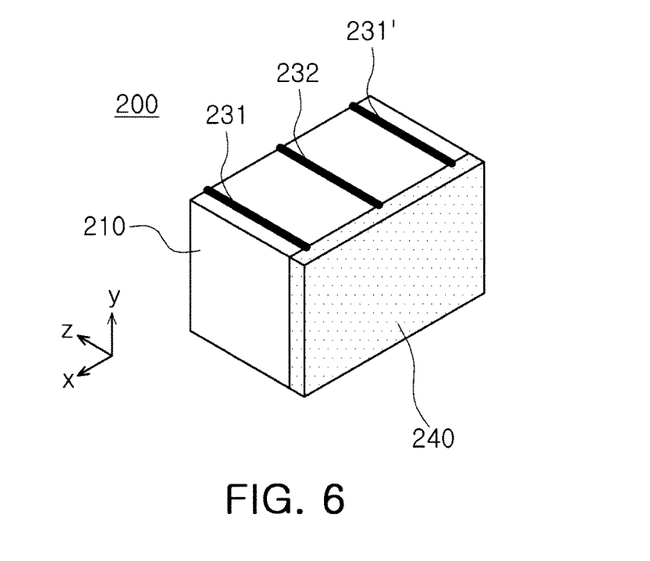
FIG. 6 is a perspective view schematically showing a multilayer ceramic capacitor according to another embodiment of the present invention.
Figure 7:
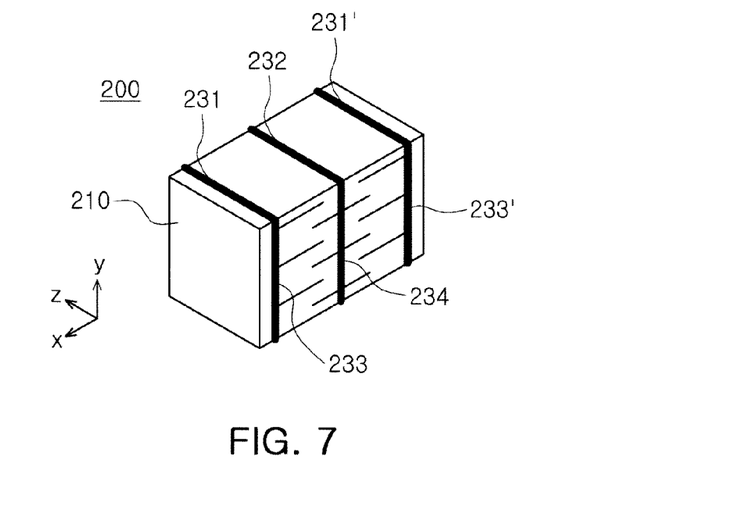
FIG. 7 is a perspective view showing a structure in which a first insulating layer is removed from the multilayer ceramic capacitor of FIG. 6.
Figure 8:
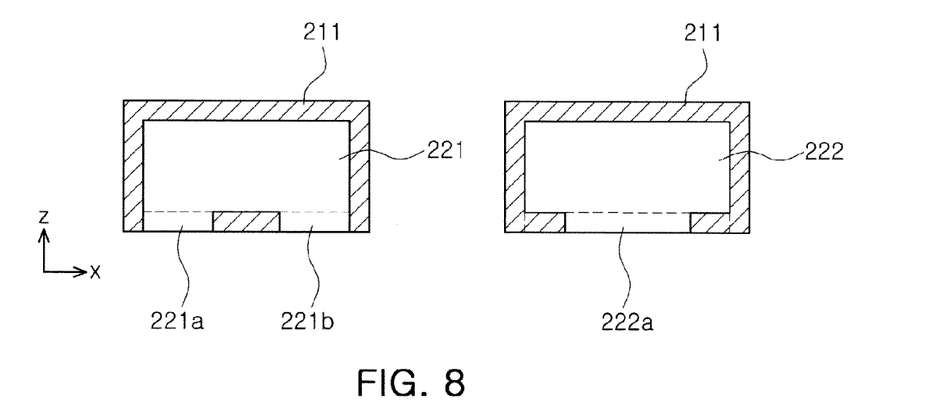
FIG. 8 is a transverse cross-sectional view showing structures of first and second internal electrodes of the multilayer ceramic capacitor of FIG. 6.
Figure 9:
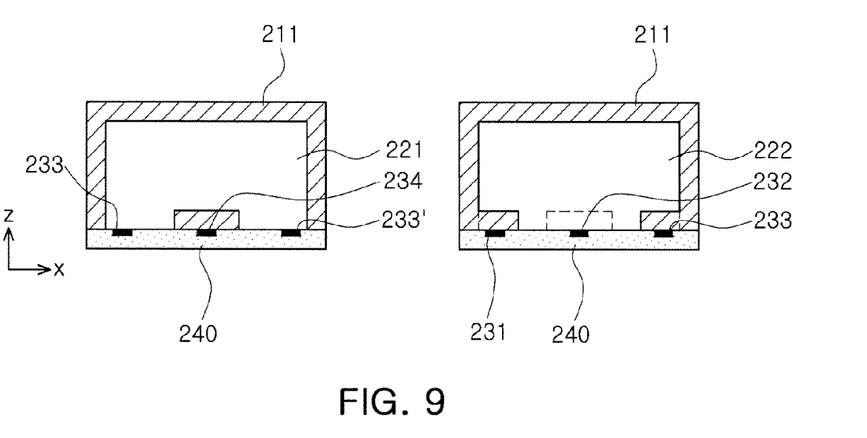
FIG. 9 is a transverse cross-sectional view showing a structure in which a first insulating layer is additionally formed in the structure of FIG. 8.

FIG. 6 is a perspective view schematically showing a multilayer ceramic capacitor according to another embodiment of the present invention; FIG. 7 is a perspective view showing a structure in which a first insulating layer is removed from the multilayer ceramic capacitor of FIG. 6; FIG. 8 is a transverse cross-sectional view showing structures of first and second internal electrodes of the multilayer ceramic capacitor of FIG. 6; and FIG. 9 is a transverse cross-sectional view showing a structure in which a first insulating layer is additionally formed in the structure of FIG. 8.

Hereinafter, components different from those in the above-mentioned embodiment will mainly be described, and a detailed description of the same components will be omitted.

A multilayer ceramic capacitor 200 according to the present embodiment may be a horizontally laminated or horizontally multilayered three-terminal ceramic capacitor.

The term "three-terminal" means that three terminals are connected to a circuit board as terminals of the capacitor.

Referring to FIGS. 6 through 9, in the multilayer ceramic capacitor 200 according to the present embodiment, a first internal electrode 221 having a first polarity and a second internal electrode 222 having a second polarity may be formed in pairs and be disposed in the y-direction so as to face each other, having each dielectric layer 211 interposed therebetween.

Here, a first external electrode may include two first lead connection portions 233 and 233' and two first external terminal portions 231 and 231'.

The two first lead connection portions 233 and 233' are formed on the first surface 1 of a ceramic body 210, and the two first external terminal portions 231 and 231' may be respectively extended from one ends of the first lead connection portions 233 and 233' to the fifth surface 5 of the ceramic body 210, to be a mounting surface.

The first and second internal electrodes 221 and 222 may have two first lead portions 221a and 221b and a second lead portion 222a respectively, so as to be connected to the two first lead connection portions 233 and 233' and a second lead connection portion 234 that have opposing polarities, the first and second lead portions 221a, 221b, 222a may be exposed to the first surface 1 of the ceramic body 210.

Here, the first lead portions 221a and 221b may respectively have regions overlapped with the second lead portion 222a of the second internal electrodes 222.

In a left-side view of FIG. 8, a portion of the first internal electrode 221 overlapped with the second internal electrode 222 is denoted by a dotted line, and in a right-side view of FIG. 8, a portion of the second internal electrode 222 overlapped with the first internal electrode 221 is denoted by a dotted line.

A first insulating layer 240 may be formed on the first surface 1 of the ceramic body 210 so as to cover the first lead portions 221a and 221b and the second lead portion 222a as well as the first lead connection portions 233 and 233' and the second lead connection portion 234. The first insulating layer may be formed to cover all of regions of the first and second lead portions 221a, 221b, and 222a, in which the first lead portions 221a and 221b and the second lead portion 222a are overlapped.

In the present invention, the terms "first and second" may be used to describe members having opposite polarities, and the terms "first and third" and "second and fourth" may be respectively used to describe members having the same polarity.

Figure 10:
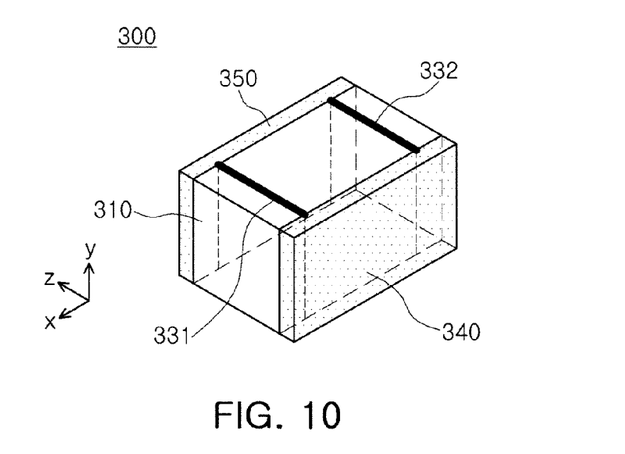
FIG. 10 is a transparent perspective view schematically showing a multilayer ceramic capacitor according to another embodiment of the present invention.
Figure 11:
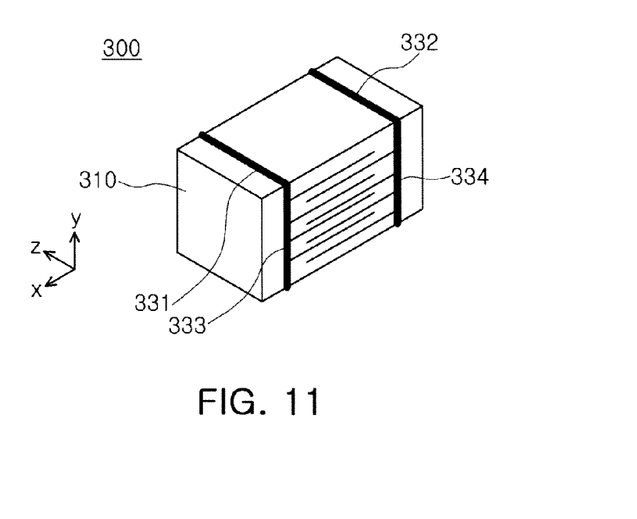
FIG. 11 is a transparent perspective view showing a structure in which a first insulating layer is removed from the multilayer ceramic capacitor of FIG. 10.
Figure 12:
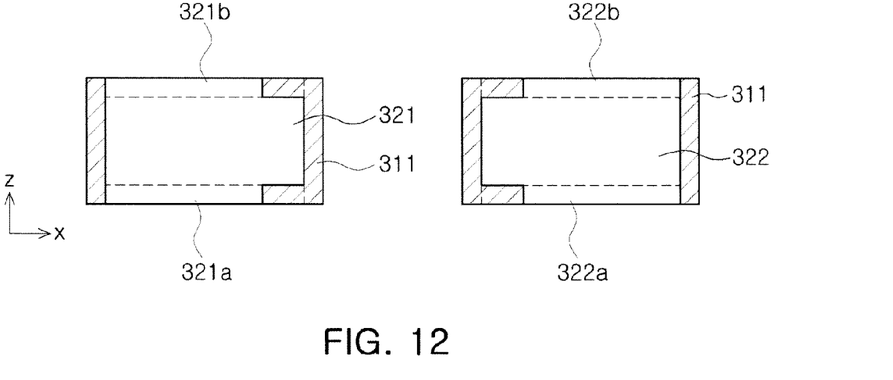
FIG. 12 is a transverse cross-sectional view showing structures of first and second internal electrodes of the multilayer ceramic capacitor of FIG. 10.
Figure 13:
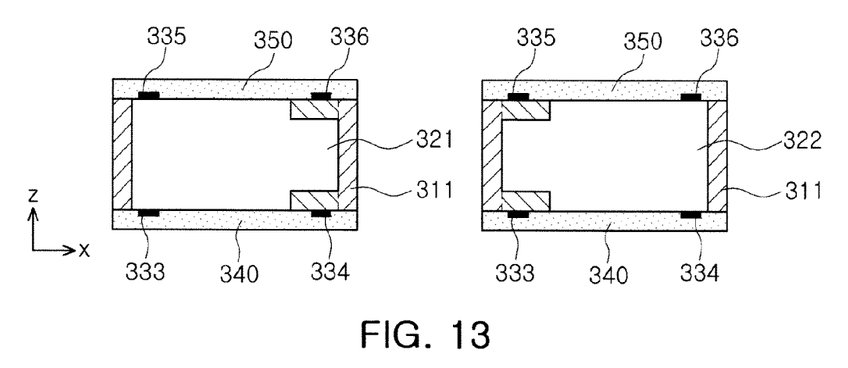
FIG. 13 is a transverse cross-sectional view showing a structure in which first and second insulating layers are additionally formed in the structure of FIG. 10.

FIG. 10 is a transparent perspective view schematically showing a multilayer ceramic capacitor according to another embodiment of the present invention; FIG. 11 is a perspective view showing a structure in which a first insulating layer is removed from the multilayer ceramic capacitor of FIG. 10; FIG. 12 is a transverse cross-sectional view showing structures of first and second internal electrodes of the multilayer ceramic capacitor of FIG. 10; and FIG. 13 is a transverse cross-sectional view showing a structure in which first and second insulating layers are additionally formed in the structure of FIG. 10.

Hereinafter, components different from those in the above-mentioned embodiment will be mainly described, and a detailed description of the same components will be omitted.

A multilayer ceramic capacitor 300 according to the present embodiment may be a horizontally laminated or horizontally multilayered four-terminal capacitor.

The term "four-terminal" means that four terminals are connected to a circuit board as terminals of the capacitor.

Referring to FIGS. 10 through 13, in the multilayer ceramic capacitor 300 according to the present embodiment, a first internal electrode 321 having a first polarity and a second internal electrode 322 having a second polarity may be formed in pairs and be disposed in the y-direction so as to face each other, having each dielectric layer 311 interposed therebetween.

The first and second internal electrodes 321 and 322 may include first and third lead portions 321a and 321b, and second and fourth lead portions 322a and 322b, respectively, so as to be connected to first and second external electrodes having opposing polarities.

The first and second lead portions 321a and 322a of the first and second internal electrodes 321 and 322 may be exposed to the first surface 1 of a ceramic body 310, and a portion of exposed regions thereof may be overlapped. In addition, the third and fourth lead portions 321b and 322b of the first and second internal electrodes 321 and 322 may be exposed to the second surface 2 of the ceramic body 310, opposing to the first surface 1, and a portion of exposed regions thereof may be overlapped.

In a left-side view of FIG. 12, portions of the first internal electrode 321 overlapped with the second internal electrode 322 are denoted by a dotted line, and in a right-side view of FIG. 12, portions of the second internal electrode 322 overlapped with the first internal electrode 321 are denoted by a dotted line.

The first surface 1 of the ceramic body 310 may be provided with first and second lead connection portions 333 and 334 so as to be connected to the first and second lead portions 321a and 322a, respectively, and the second surface 2 of the ceramic body 310 may be provided with third and fourth lead connection portions 335 and 336 so as to be connected to the third and fourth lead portions 321b and 322b, respectively.

The first and third lead connection portions 333 and 335 may be respectively connected to both ends of a first external terminal portion 331 formed on the fifth surface 5 of the ceramic body 310 and the second and fourth lead connection portions 334 and 336 may be respectively connected to both ends of a second external terminal portion 332 formed on the fifth surface 5 of the ceramic body 310, thereby being connected to an external polarity source such as a substrate.

A first insulating layer 340 may be formed on the first surface 1 of the ceramic body 310 so as to cover the first and second lead portions 321a and 322a and the first and second lead connection portions 333 and 334. The first insulating layer 340 may be formed to cover all of regions of the first and second lead portions 321a and 322a in which the first and second lead portions 321a and 322a are overlapped.

In addition, a second insulating layer 350 may be formed on the second surface 2 of the ceramic body 310 so as to cover the third and fourth lead portions 321b and 322b and the third and fourth lead connection portions 335 and 336. The second insulating layer 350 may be formed to cover all of regions of the third and fourth lead portions 321b and 322b in which the third and fourth lead portions 321b and 322b are overlapped.

In the present invention, the terms "first and second" may be used to describe members having opposing polarities, and the terms "first and third" and "second and fourth" may be respectively used to describe members having the same polarity.

Hereinafter, a method of manufacturing a multilayer ceramic capacitor according to the embodiment of the present invention will be described.

First, a plurality of first and second ceramic green sheets may be prepared.

The first and second ceramic green sheets, provided to form dielectric layers of a ceramic body, may be fabricated by mixing a ceramic powder, a polymer, and a solvent to prepare a slurry and forming the prepared slurry into sheets having a thickness of several micrometers (μm) by a doctor blade method, or the like.

The ceramic powder may include a barium titanate (BaTiO$_3$) based material. However, the present invention is not limited thereto. For example, the ceramic powder may include $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$ in which calcium (Ca), zirconium (Zr), and the like are partially dissolved in barium titanate (BaTiO$_3$), or the like.

A ceramic additive, an organic solvent, a plasticizer, a binder, and a dispersant are mixed with the ceramic powder to prepare the slurry using a basket mill.

Next, a conductive paste may be printed on at least one surface of each of the first and second ceramic green sheets to have a predetermined thickness, for example, a thickness of 0.1 to 2.0 μm, to form respective first and second internal electrodes.

Here, the first internal electrode may include two or more first lead portions so as to be exposed through one surface of the first ceramic sheet, and in this case, two or more first lead connection portions to be described below may be formed to correspond thereto.

The first and second internal electrodes may be formed such that the respective first and second lead portions are exposed through one end surfaces of the first and second ceramic green sheets and the first and second lead portions may have regions thereof overlapped with each other.

As the method of printing the conductive paste, a screen printing method, a gravure printing method, or the like, may be used, and the conductive paste may include a metal powder, a ceramic powder, a silica (SiO2) powder, and the like.

Then, a plurality of the first and second ceramic green sheets including the first and second internal electrodes formed thereon may be alternately stacked and pressurized in a direction in which the ceramic green sheets are stacked, thereby compressing the stacked first and second ceramic green sheets and the first and second internal electrodes formed thereon.

By doing so, a stacked body in which a plurality of dielectric layers and the plurality of first and second internal electrodes are alternately stacked may be formed.

Next, the stacked body may be cut into chips corresponding to respective multilayer ceramic capacitors, and the cut chip may be plasticized and fired at high temperature, and then subjected to polishing, thereby completing the ceramic body 110 having the first and second electrodes 121 and 122.

Then, first and second lead connection portions 133 and 134 may be formed on the first surface 1 of the ceramic body 110 to contact the exposed portions of first and second lead portions 121a and 122a to thereby be electrically connected thereto, respectively.

Here, the first lead connection portion 133 may be vertically extended in a direction in which the first and second ceramic green sheets are stacked, in a region of the first lead portion 121a that is not overlapped with the second lead portion 122a on the first surface 1 of the ceramic body 110.

Further, the second lead connection portion 134 may be vertically extended in the direction in which the first and second ceramic green sheets are stacked, in a region of the second lead portion 122a that is not overlapped with the first lead portion 121a on the first surface 1 of the ceramic body 110.

Thereafter, the first and second external terminal portions 131 and 132 may be formed on the fifth surface 5 of the ceramic body 110 such that they are extended from one ends of the first and second lead connection portions 133 and 134 and exposed to the outside.

In this case, third and fourth external terminal portions (not shown) extended from the other ends of the first and second lead connection portions 133 and 134 and exposed to the outside may further be formed on the sixth surface 6 opposing the fifth surface 5 on which the first and second external terminal portions 131 and 132 are formed.

Through the configuration as described above, the fifth or sixth surface 5 or 6 of the ceramic body 110 may be a mounting surface, to be mounted on a substrate, or the like.

Next, the first insulating layer 140 may be formed by applying a ceramic slurry to the first surface 1 of the ceramic body 110 so as to cover all of the first and second lead portions 121a and 122a and the first and second lead connection portions 133 and 134 exposed to the first surface 1.

As a method of applying the slurry, for example, a spray method or a method of using a roller may be used, but the present invention is not limited thereto.

Meanwhile, in the case of manufacturing a horizontally laminated four-terminal ceramic capacitor, the following operations may further be added.

Referring to FIGS. 10 through 13, in the forming of the first and second internal electrodes, the respective third and fourth lead portions 321b and 322b exposed through the second surface 2 of the first and second ceramic sheets may further be formed, and the third and fourth lead portions 321b and 322b may have regions thereof overlapped with each other.

In addition, the third and fourth lead connection portions 335 and 336 connected to the third and fourth lead portions 321b and 322b, respectively, and connected to one ends of the first and second external terminal portions 331 and 332, respectively may be formed on the second surface 2 of the ceramic body 310.

The third lead connection portion 335 may be formed in the direction in which the first and second ceramic green sheets are stacked, in a region of the third lead portion 321b that is not overlapped with the fourth lead portion 322b on the second surface 2 of the ceramic body 310, and the fourth lead connection portion 336 may be formed in the direction in which the first and second ceramic green sheets are stacked, in a region of the fourth lead portion 322b that is not overlapped with the third lead portion 321b on the second surface 2 of the ceramic body 310.

Next, the second insulating layer 350 may be formed by applying the ceramic slurry to the second surface 2 of the ceramic body 310 so as to cover all of the third and fourth lead portions 321b and 322b and third and fourth lead connection portions 335 and 336.

Here, the first and second insulating layers 340 and 350 may be formed by a BMP method.

Figure 14A:
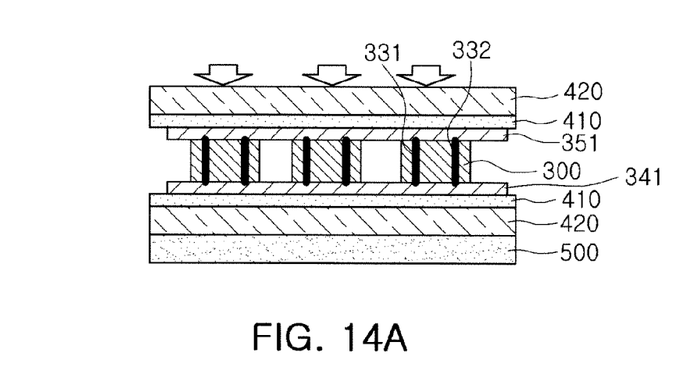
FIGS. 14A through 14C are plan views sequentially showing a process of forming the first and second insulating layers by a biscuit margin punching method during a process of manufacturing the multilayer ceramic capacitor of FIG. 10.
Figure 14B:
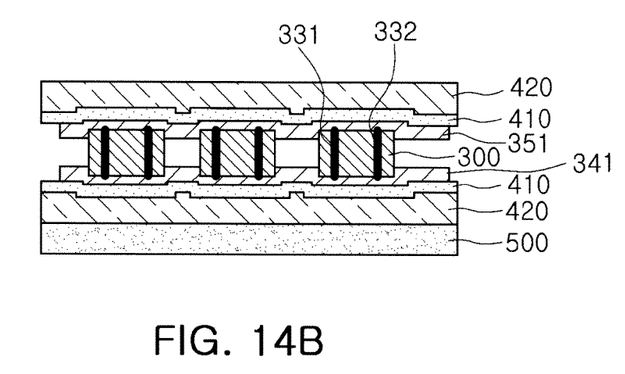
Figure 14C:
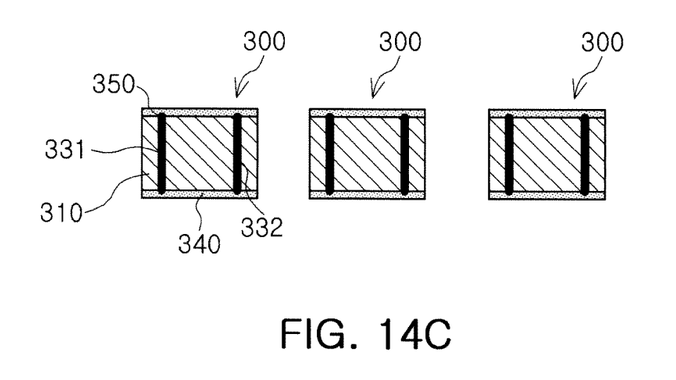

Referring to FIGS. 14A through 14C, in the BMP method, the ceramic body 310 in which no margins of first and second internal electrodes are present in first and second surfaces 1 and 2 and a plurality of first and second external electrodes are formed is subjected to a plasticizing process to be prepared, first.

The plasticized ceramic body 310 as described above may be provided in plural and the plurality of plasticized ceramic bodies 310 may be automatically aligned using magnetic force, or the like. In this case, a plasticity range may be limited in such a manner that a firing shrinkage is 5% to 16% in order to impart a predetermined level of strength to the ceramic body 310.

Then, the plurality of ceramic bodies 310 are disposed such that the first surface 1 thereof is directed to the front.

Then, cover sheets 341 and 351 formed of a material having the same component content as or a glass content 1 to 2.5 times that of the ceramic body or a material obtained by adding an additive such as a magnesium (Mg) oxide or manganese (Mn) oxide, or the like, in an amount of 1 to 2.5 times that of the ceramic body are applied to the first and second surfaces 1 and 2 of the ceramic body 310 in a symmetrical manner with a predetermined thickness. Then, in order to prevent another member from being attached thereto, releasing films 410 are disposed thereon.

Further, after cushion members 420 formed of a material such as rubber, or the like are disposed on the releasing films 410 and a supporting plate 500 formed of a metal such as aluminum, or the like, is disposed on the cushion member in a side of the first surface 1, a primary compression process is performed under a wide range of compression pressure, compression time, and compression temperature conditions, such that the cover sheets 341 and 351 may be attached to the first and second surfaces 1 and 2 of each ceramic body 310 at a uniform thickness.

In this case, when the compression pressure is excessively low, the cover sheets 341 and 351 may not be sufficiently attached to the first and second surfaces 1 and 2, while when the compression pressure is excessively high, the ceramic body 310 may be damaged.

According to the present invention, since the ceramic body 310 is partially shrunk by performing the plasticizing process in advance, it may be difficult to further shrink the ceramic body, such that crack generations according to the formation of the insulating layers 340 and 350 may be reduced.

Thereafter, the cover sheets 341 and 351 are cut, corresponding to a size of the ceramic body 310, thereby completing the multilayer ceramic capacitor 300 in which the insulating layers 340 and 350 are formed.

That is, according to the present invention, since respective both ends of the first and second internal electrodes 321 and 322 are symmetrically exposed and the first and second external electrodes are bent at an angle of 90° to be formed over three surfaces of the ceramic body 310, a directional arrangement is not required at the time of forming external electrodes, such that workability may be improved.

As set forth above, according to the embodiment of the present invention, a portion of the first and second internal electrodes in which the first and second internal electrodes are overlapped with each other is significantly increased, such that the capacitance of the multilayer ceramic capacitor may be increased.

In addition, the internal electrode is formed without a width margin, and the insulating layer is formed on the surface of the ceramic body to which the internal electrode is exposed, such that there is no need to consider a margin alignment, and the margin may be formed to have a predetermined thickness desired by a user.

Further, since the internal electrode is horizontally disposed with respect to the surface of the external terminal portion that will be a mounting surface, the multilayer ceramic capacitor may be mounted on the substrate in a horizontal manner, such that a height of a fillet may be reduced, and generation of acoustic noise in a ultrahigh capacitance product may be reduced.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic capacitor comprising:
    a ceramic body;
    first and second internal electrodes including first and second lead portions having regions overlapped with each other and exposed to one surface of the ceramic body, respectively;
    first and second external electrodes including first and second lead connection portions formed on the one surface of the ceramic body and connected to the first and second lead portions, respectively, and first and second external terminal portions formed to extended from one ends of the first and second lead connection portions to a surface perpendicular to the one surface of the ceramic body to which the first and second lead portions are exposed to thereby be exposed to the outside, respectively; and
    a first insulating layer formed on the one surface of the ceramic body so as to cover the first and second lead portions and the first and second lead connection portions that are exposed to the one surface of the ceramic body.

2. The multilayer ceramic capacitor of claim 1, wherein the first and second internal electrodes are horizontally disposed with respect to the surface of the ceramic body on which the first and second external terminal portions are formed.

3. The multilayer ceramic capacitor of claim 1, wherein the first lead connection portion is connected to a region of the first lead portion that is not overlapped with the second lead portion, and the second lead connection portion is connected to a region of the second lead portion that is not overlapped with the first lead portion.

4. The multilayer ceramic capacitor of claim 1, wherein the first insulating layer is formed to cover all of the first and second lead portions and the first and second lead connection portions.

5. The multilayer ceramic capacitor of claim 1, wherein the first and second external electrodes further include third and fourth external terminal portions extended from the other ends of the first and second lead connection portions to a surface opposing the surface of the ceramic body on which the first and second external terminal portions are formed to thereby be exposed to the outside, respectively.

6. The multilayer ceramic capacitor of claim 1, wherein in the first internal electrode, the first lead portion includes a plurality of first lead portions exposed to the one surface of the ceramic body and respectively have regions overlapped with the second lead portion, and the first external electrode includes a plurality of first external electrodes connected to the plurality of first lead portions.

7. The multilayer ceramic capacitor of claim 1, wherein the first and second internal electrodes include third and fourth lead portions exposed to the other surface opposing the one surface of the ceramic body, respectively, and the third and fourth lead portions have regions overlapped with each other.

8. The multilayer ceramic capacitor of claim 7, wherein the first and second external electrodes further include third and fourth lead connection portions formed on the other surface opposing the one surface of the ceramic body, connected to the third and fourth lead portions, and connected to one ends of the first and second external terminal portions, respectively.

9. The multilayer ceramic capacitor of claim 8, wherein the third lead connection portion is connected to a region of the third lead portion that is not overlapped with the fourth lead portion and the fourth lead connection portion is connected to a region of the fourth lead portion that is not overlapped with the third lead portion.

10. The multilayer ceramic capacitor of claim 8, further comprising a second insulating layer formed on the other surface opposing the one surface of the ceramic body and covering the third and fourth lead portions and the third and fourth lead connection portions that are exposed to the other surface of the ceramic body.

11. The multilayer ceramic capacitor of claim 10, wherein the second insulating layer is formed to cover all of the third and fourth lead portions and the third and fourth lead connection portions.

12. A manufacturing method of a multilayer ceramic capacitor, the manufacturing method comprising:
    forming a first internal electrode on a first ceramic sheet such that a first lead portion is exposed through one end surface of the first ceramic sheet;
    forming a second internal electrode on a second ceramic sheet such that a second lead portion is exposed through one end surface of the second ceramic sheet while having regions overlapped with the first lead portion;
    forming a ceramic body by alternately stacking and firing a plurality of the first and second ceramic sheets on which the first and second internal electrodes are formed;
    forming first and second lead connection portions on one surface of the ceramic body so as to be connected to the first and second lead portions, respectively;
    forming first and second external terminal portions extended from one ends of the first and second lead connection portions and exposed to the outside on a surface perpendicular to the one surface of the ceramic body to which the first and second lead portions are exposed; and
    forming a first insulating layer on the one surface of the ceramic body so as to cover the first and second lead portions and the first and second lead connection portions.

13. The method of claim 12, wherein in the forming of the first and second lead connection portions, the first lead connection portion is formed in a direction in which the first and second ceramic sheets are stacked in a region of the first lead portion that is not overlapped with the second lead portion on the one surface of the ceramic body, while the second lead connection portion is formed in the direction in which the first and second ceramic sheets are stacked in a region of the second lead portion that is not overlapped with the first lead portion on the one surface of the ceramic body.

14. The method of claim 12, wherein the forming of the first insulating layer is performed by applying a ceramic slurry to the one surface of the ceramic body so as to cover all of the first and second lead portions and the first and second lead connection portions.

15. The method of claim 12, further comprising forming third and fourth external terminal portions extended from the other end of the first and second lead connection portions to be exposed to the outside on a surface opposing the surface on which the first and second external terminal portions are formed, after the forming of the first and second external terminal portions.

16. The method of claim 12, wherein in the forming of the first internal electrode, the first lead portion may be provided in plural and the plurality of first lead portions are formed to be exposed through the one end surface of the first ceramic sheet and respectively have regions overlapped with the second lead portion, and in the forming of the first lead connection portion and the first external terminal portion, the first lead connection portion and the first external terminal portion are respectively provided in plural and the plurality of first lead connection portions and first external terminal portions are connected to the plurality of first lead portions.

17. The method of claim 12, wherein in the forming of the first and second internal electrodes, third and fourth lead portions exposed through the other end surface opposing the one end surface of the first and second ceramic sheets are further formed, respectively, and the third and fourth lead portions have regions overlapped with each other.

18. The method of claim 17, further comprising forming third and fourth lead connection portions connected to the third and fourth lead portions and one ends of the first and second external terminal portions, respectively, on the other surface opposing the one surface of the ceramic body, after the forming of the first and second lead portions.

19. The method of claim 18, wherein in the forming of the third and fourth lead connection portions, the third lead connection portion is formed in a direction in which the first and second ceramic sheets are stacked in a region of the third lead portion that is not overlapped with the fourth lead portion on the other surface of the ceramic body, while the fourth lead connection portion is formed in the direction in which the first and second ceramic sheets are stacked in a region of the fourth lead portion that is not overlapped with the third lead portion on the other surface of the ceramic body.

20. The method of claim 18, further comprising forming a second insulating layer on the other surface opposing the one surface of the ceramic body by applying a ceramic slurry so as to cover all of the third and fourth lead portions and the third and fourth lead connection portions, after the forming of the first insulating layer.

21. The method of claim 20, wherein the first and second insulating layers are formed by a BMP method.

* * * * *